March 1, 1927.
W. M. CROW
1,619,059
FOUR-HORSE WAGON EVENER
Filed Oct. 26, 1923
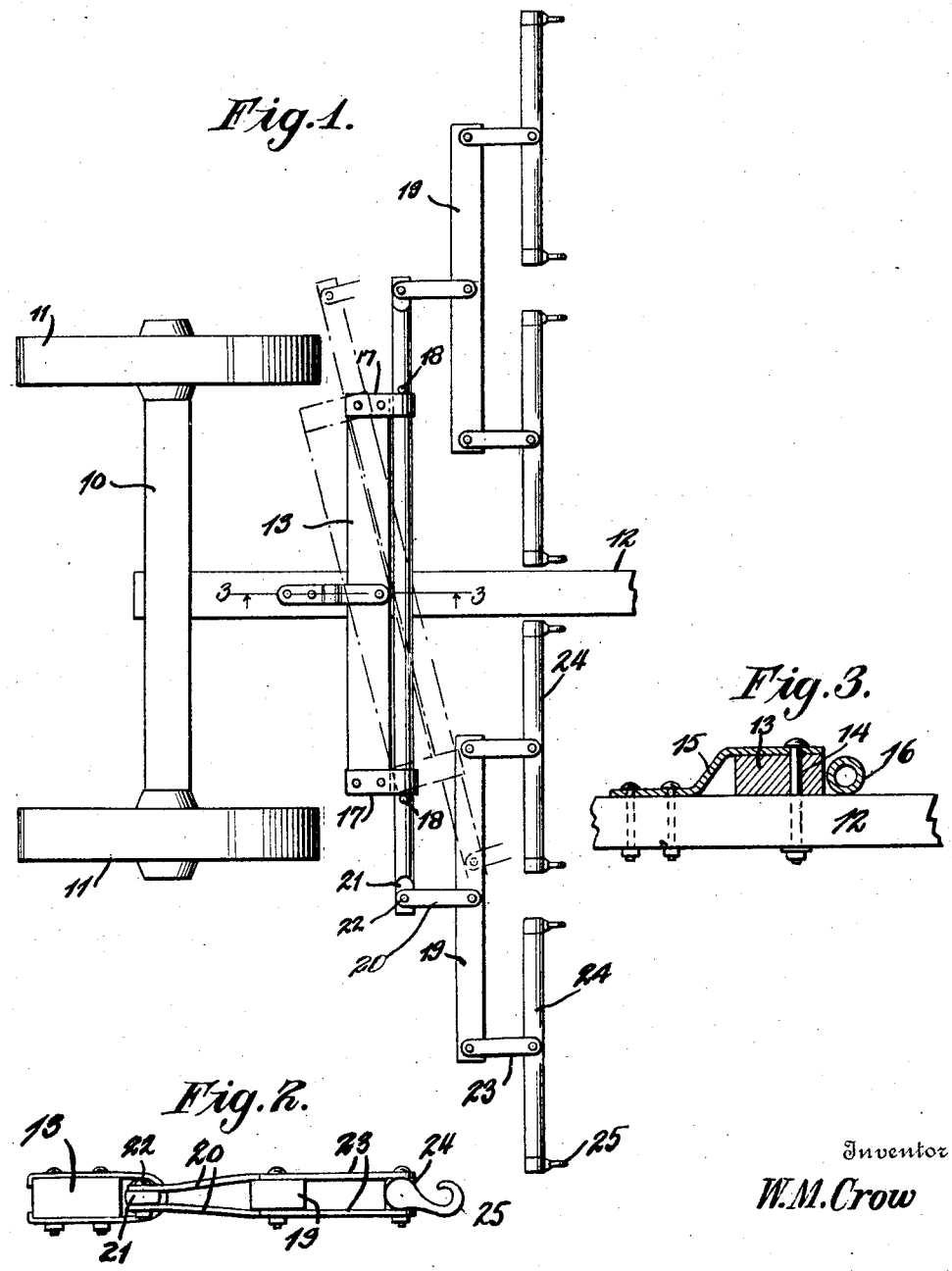
Inventor
W. M. Crow Patented Mar. 1, 1927.

1,619,059

UNITED STATES PATENT OFFICE.

WILLIAM M. CROW, OF COLE, SOUTH DAKOTA.

FOUR-HORSE-WAGON EVENER.

Application filed October 26, 1923. Serial No. 670,909.

This invention has reference to an improved horse evener or equalizing bar to which the whippletrees of a vehicle are adapted to even up the pull of the draft animals.

An object of the invention is to provide a four-horse wagon evener for working four horses abreast with the pressure or pull equally aportioned among the animals; and it further contemplates the provision of a four-horse evener so designed and constructed as to offer no interference, when turning, with the wheels of the vehicle, as is generally the fault of the ordinary straight eveners.

An additional object is to provide a four-horse evener in which the main bar is centered on the pole of the wagon and the secondary, or whippletree-carrying bars are loosely anchored to the main bar so as to easily and automatically drop down from a horizontally position should the wagon run onto the horses, as when going down hill.

With the above and other objects in view, the invention consists in the novel arrangement and construction of parts set forth in the following description and illustrated in the accompanying drawing, wherein:

Figure 1 is a view, in top plan, of the proposed device, illustrating the manner of applying same.

Figure 2 is an end view of the evener, showing the manner in which the secondary bars are mounted for dropping down movement, and Figure 3 is a sectional view on line 3—3 of Figure 1.

Describing the invention in detail, 10 designates a front wagon axle supported by wheels 11 and having connection, in the usual manner, with the wagon pole 12. In mounting my improved four-horse evener upon the structure described, the main bar 13 of the invention is centered upon the wagon pole 12 for movement about a vertical axis; a pivot bolt 14 and a metal strap 15 serving to hold the same in place thereon, as shown to advantage in Figure 3. It will be here noted that the bolt 14 is located nearer to the front face rather than the rear face of the bar and, hence, constitutes an eccentric pivot about which the bar revolves. The purpose and object of this arrangement is to cause the opposite ends of the main bar to swing inwardly of, and thus clear, the front wheels of the wagon when moved in the direction of the wheel, as when making a turn. Bar 13 is preferably of wood and of such length as to have its opposite ends terminating inwardly of the wagon wheels 11 so as to clear the same when the bar is located about its eccentric pivot while making a right or left hand turn. Arranged forwardly of a main bar 13 and extending parallel therewith, is a hollow pipe 16 of such length as to extend appreciably beyond the main bar at each end. This pipe is spaced slightly from the forward face of the main bar and is loosely supported in strap loops 17 fastened at each end of bar 13. Suitable stop pins 18 are provided on the pipe for engagement with strap loops 17 to prevent longitudinal sliding movement of the pipe, which, however, is capable of turning about its horizontal axis.

The secondary bars of the evener are indicated at 19 and are pivotally connected to opposite ends of pipe 16 by suitable link members 20; the pipe 16 having its ends flattened, as at 21, to facilitate the fastening thereto of the link members by bolts or other fasteners 22. Connected to each secondary bar 19 by suitable links 23, is a pair of whippletrees 24, carrying the usual hooks 25. Hence, it will be seen that provision is made for hitching the horses to the wagon evener four abreast, there being two horses on each side of the wagon pole. Moreover, it will be seen that the pull is aportioned equally among the four horses and since the main bar 13 is of such a width as to space pipe 16 a sufficient distance forwardly thereof so as to avoid striking the wheels 11 when making a turn, there will be no interference with the wheels. The dotted line structure of Figure 1 illustrates the relative position of the wheels and the evener when making a turn. The pull of the draft animals on the whippletrees normally maintains the secondary bars 14 in a horizontal plane, but when the team is unhitched, or when the wagon moves forward under its own impetus, as when going down hill, the secondary bars drop down according to the degree of slackness in the pull-traces, thus avoiding injury to the animals.

From the foregoing it will be seen that the invention provides a four-horse wagon evener which embodies but few parts capable of being readily assembled or taken apart whenever required and which, in addition to evening the pull of the draft animals, tends, also, to prevent injury to the latter.

What is claimed is:—

In a four-horse wagon evener, in combination, a wagon pole, a main bar centered crosswise upon the said pole and eccentrically pivoted thereto with its opposite ends terminating inwardly of the wagon wheels to clear the same when making a turn, a hollow pipe rotatably mounted on the main bar adjacent the forward edge thereof, said hollow pipe being of such length as to project an appreciable distance beyond each end of the main bar and said main bar being so mounted with respect to the wagon wheels as to space the said pipe a sufficient distance forwardly of the wagon wheels to avoid striking the wheels when making a turn, a forwardly projecting connecting member at each end of the said hollow pipe adapted to be normally maintained in a horizontal plane by the pull of the draft animals, a secondary bar centrally pivoted to the outer end of each connecting member, and a whiffletree centrally pivoted at each end of each secondary bar.

In testimony whereof I affix my signature.

WILLIAM M. CROW.